April 18, 1933.  T. P. KELLER  1,904,469
PRODUCTION OF CARBON BLACK
Filed Feb. 19, 1931
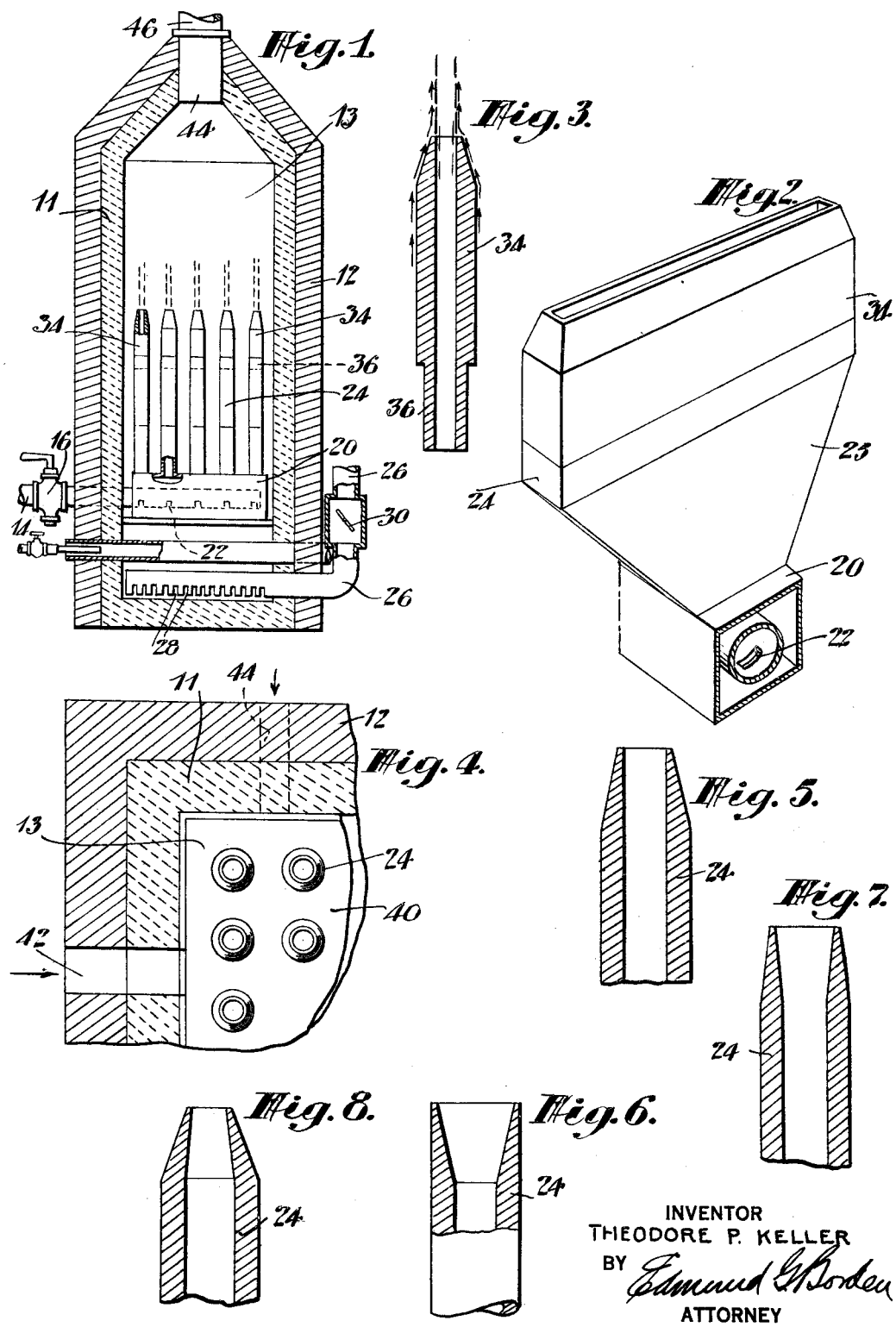
INVENTOR
THEODORE P. KELLER
BY Edmund G. Borden
ATTORNEY Patented Apr. 18, 1933                                                                                                    1,904,469

UNITED STATES PATENT OFFICE

THEODORE P. KELLER, OF ELIZABETH, NEW JERSEY, ASSIGNOR TO GENERAL ATLAS CARBON COMPANY, OF DOVER, DELAWARE, A CORPORATION OF DELAWARE

PRODUCTION OF CARBON BLACK

Application filed February 19, 1931. Serial No. 516,980.

This invention relates to the production of carbon black, and more particularly it concerns an improvement in processes for the production of carbon black involving the incomplete oxidation of gaseous or vaporized hydrocarbons in an unobstructed, heated, enclosed space. The invention has especial utility in connection with such a process in which alternate strata of a combustible carbonaceous gas and a combustion-supporting gas are together caused to move in streamline, non-turbulent flow throughout the length of a carbon black furnace or that portion thereof forming a high temperature decomposition zone. Such a process and apparatus adapted for use therewith in accordance with the diffusion flame principle, are disclosed in the respective copending patent application Serial No. 218,755 of Stephen P. Burke, filed September 10, 1927, and patent application Serial No. 219,152, of David J. Beaver, filed September 12, 1927. These processes for carbon black production have been found to give unusually high yields of carbon black of a quality highly suited for use in rubber goods manufacture, ink production,—and for other similar uses.

In operations of the character disclosed in the said copending applications, carbon black is produced by the controlled combustion of alternate layers of air and of a gaseous or liquid hydrocarbon flowing into and through the furnace at certain controlled velocities; and particularly valuable results are obtainable when the respective velocities of the gas and air streams are approximately the same.

In carbon black operations in the past in which partial combustion reactions producing the carbon black were conducted in enclosed, unobstructed, heat-insulated chambers,—including instances where such operations utilized the diffusion-flame principle for controlling stream flow and reaction velocity, certain difficulties have been encountered at times in maintaining a uniform production of carbon black, due to the more or less rapid formation of carbon deposits at the outlet ends of the standard burner ducts, due apparently to the effect, at the high furnace temperatures involved of a slight incipient turbulence developed at such duct outlets as the gas moves outwardly to meet the air at points immediately above the duct wells.

This carbon deposit thereafter gradually increases in amount due to further hydrocarbon decomposition induced by contact thereof with incandescent carbon already deposited at the duct outlets, and frequently extending upwardly 3 or 4 inches above the burner tips, forming a mantle of incandescent carbon which ultimately may bridge across the duct openings.

This obstruction not only serves to destroy or seriously interfere with the highly desirable control of the uniformity of flow of the gas and air within the carbon black furnace, but it has been found also to serve as an ideal surface upon which the gas may crack. Furthermore the gas, thus abruptly moving out to meet the air supply, in changing its direction causes an undesirable increase in the flame thickness of approximately 50%,—a condition found to seriously interfere with the efficiency of the process as well as with the uniformity of the grade of carbon black product.

Prior to the present invention it was necessary, therefore, to frequently shut down the carbon black furnace for the purpose of cleaning these burner tips,—this being done as often as several times a day. This did not, however, prevent the objectionable formation of substantial quantities of intermediate decomposition products resulting from hydrocarbon decomposition adjacent the said carbon deposits, and the production of substantial amounts of acetone-soluble matter on or in the carbon black.

Applicant has now discovered that these objectionable features of prior carbon black processes may be substantially overcome, and increased yields of improved carbon black may be produced by modifying the burner duct construction whereby the outlet ends thereof are suitably beveled either internally or externally or both, in a manner hereinafter more fully described and adapted to facilitate streamline flow of the moving fluids at these points. It is thus possible to bring the air into contact with the moving stream of gas flowing from the gas duct more quickly and smoothly, and substantially without interference with the smooth, streamline flow of each, thereby confining the resultant flame to the intended dimensions and insuring the absence of any solid surface upon which carbon black may deposit as formed.

The invention is hereinafter described in connection with a process for carbon black production according to which a plurality of contiguous parallel fluid sheets or streams,—alternate streams respectively comprising a hydrocarbon and an oxygen-containing fluid,—move vertically through a heated, enclosed furnace. However, it is not to be regarded as limited to the use of a furnace construction adapted to facilitate such a process, but is applicable to carbon black processes in which are employed other types of furnaces provided with one or more gas ducts having beveled upper margins or outlet ends.

Among the more important objects of the invention therefore are:

To provide in an improved manner for the production of carbon black in an unobstructed, heated, enclosed space;

To provide a novel process and apparatus for the production of carbon black having a low content of acetone-soluble matter;

To provide for preventing carbon formation at the gas duct outlets within a carbon black furnace;

To provide in a novel manner for controlling the flame thickness in a carbon black process carried out in a heated enclosed space; and To provide a novel method and apparatus for facilitating the production of carbon black in accordance with the diffusion flame principle involving the use of parallel, non-turbulent alternate streams of a carbonaceous gas and an oxygen-supplying gas.

In the accompanying drawing illustrating certain preferred forms of the invention, Fig. 1 is a section through a carbon black furnace;

Fig. 2 is a view in perspective of a section through a gas duct and associated parts illustrating one modification of the present invention, parts being broken away;

Fig. 3 is a cross sectioned view of a burner tip adapted for use with the furnace of Fig. 1;

Fig. 4 is a fragmentary view in horizontal section of a carbon black furnace, illustrating a form of burner construction in which a plurality of circular burners are employed;

Fig. 5 is a fragmentary longitudinal section through a circular burner duct; and Figs. 6 to 8 are respectively fragmentary longitudinal sections through other forms of burner duct construction.

Referring to Fig. 1 of the drawing, there is shown a vertically-disposed furnace provided with an inner refractory lining 11, and an insulated outer wall 12 jacketed for preventing substantial loss of heat from the furnace. A carbonaceous gas or vapor, preferably under pressure, as for instance natural gas or cracking still gases is introduced into the furnace through a pipe 14, a valve 16 therein permitting regulation of the flow of gas to the combustion chamber 13 of the furnace. A flow meter (not shown) may, if desired, be provided in the pipe line 14 for use in measuring the desired amount of gas to be introduced into the furnace. The pipe 14 communicates within the furnace with a horizontal duct or header 20, the latter of which extends almost the entire length of the furnace, the said duct being conveniently made in the form of a rectangular box as shown.

A plurality of spaced slots 22 are provided in the under side of the portion of pipe 14 extending within the duct 20, for permitting even distribution throughout the latter of the gas flowing into it.

In the modification shown in Figs. 1 to 3, a plurality of spaced, relatively narrow, parallel gas ducts 24, 24 extend upwardly from the duct 20 within the furnace chamber, the respective ducts 24 being of similar length and height, and being enlarged outwardly and upwardly at an intermediate portion 25 of their height so as to occupy most of the width of the furnace adjacent their outlet ends as shown. The thickness of each and all of the respective ducts 24 remains the same throughout their length and height.

For introducing air in controlled amounts into the lower portion of the furnace below the header 20 and the gas ducts 24, there is provided an air conduit 26 connected with a source of air under suitable pressure. An end of the conduit 26 extends into the furnace adjacent the floor thereof and is provided with a series of spaced notches or openings 28 through which air is admitted and flowed upwardly into the furnace. A damper or flow-regulating device 30 in the conduit 26 permits the controlled flow of air into the furnace. A flow meter (not shown) may be associated with conduit 26 for measuring the amount of air flowing to the furnace.

The burner ducts 24 shown in Figs. 1 to 3 have their outer upper marginal portions beveled upwardly and inwardly toward the inner wall surface of the ducts in the manner shown, in order to reduce or prevent any tendency toward turbulence of the air and gas moving upwardly in contiguous streams. In one application of the invention wherein gas ducts permitting an effective gas layer thickness of $\frac{1}{2}$ inch and having a duct wall thickness of $\frac{1}{4}$ inch were employed, the beveled portion extended downwardly from the burner tip $\frac{3}{4}$ of an inch and the duct wall thickness at the extreme upper margin was $\frac{1}{16}$ of an inch. This burner design gave highly satisfactory results in processing both natural gas and higher hydrocarbons of the methane series.

While very satisfactory results are obtained by using burner ducts in which only the upper margins of the outer side walls are beveled to bring their inner and outer walls surfaces closely together at the duct outlets, it is frequently desirable to use gas ducts having their entire upper portions beveled in the manner indicated for a substantial portion or all of their length. The extent to which the thickness of the upper marginal portions of the duct may be reduced is limited only by the degree of deterioration of thin layers of metal by exposure to the high temperature attained in the furnace.

It is therefore preferable to employ high temperature alloys such as chrome iron or Hybnickel for the manufacture of the beveled burners. Likewise suitable burners for the present purpose may be made from other suitable heat resistance materials such as the usual high temperature refractories.

In order to facilitate continuous uninterrupted operation of the carbon black furnace, the invention further contemplates the use when desired of special burner tips 34 of heat resistant alloy metals or of refractory materials, which tips may be constructed, for example, as shown in Fig. 3. The lower ends of these burner tips are provided with sockets or shouldered portions 36 of reduced size, adapted to be inserted in the upper end of the burner ducts 24 and to be readily removable therefrom, should occasion require it.

In the modification of the invention exemplified in Fig. 4, wherein a plurality of parallel tubular gas ducts are employed, the upper margin or outlet end of each duct has one or both wall surfaces beveled, preferably in similar manner to that disclosed in connection with the description of Figs. 1 to 3. The general furnace construction may be the same as that shown in Fig. 1, with the exception that a metal or alloy plate 40 is mounted in the lower portion of the furnace immediately below the point of connection therewith of a valve-controlled air conduit 42. A plurality of the tubular ducts 24 are mounted vertically within the furnace and have their lower ends extending through the plate 40 and communicating with the space immediately below the said plate.

A valve-controlled gas conduit 44 connects the portion of the furnace below the plate 40 with a source of gaseous or vaporized hydrocarbon under suitable pressure. The gas ducts 24 extend upwardly above the vertical level in the furnace of inlet end of the air conduit 42 a sufficient distance to permit uniform distribution of the air around each of the gas ducts and a uniform flow upwardly of the air and the gas at points adjacent the upper beveled margins of the burner tips This type of tubular gas duct construction has the advantage of permitting somewhat hotter flames than are obtained by the flattened burner duct construction shown in Figs. 1 and 3. It is not essential although highly desirable when tubular gas ducts are used that they be circular in transverse section. Other tubular shapes having oval or other tubular sectional shapes may be employed.

Instead of employing the specific beveled duct construction shown in Figs. 1 to 5, similarly satisfactory results may be obtained by employment of an internally beveled duct wall construction such as exemplified in Fig. 6; or by an arrangement where the upper margins of both the outer and inner surfaces of each gas duct wall slope toward each other, as shown in Fig. 7. In one form of such construction, the upper margin of both the inner and outer surfaces of each duct may gently slope outwardly or inwardly toward each other in the manner shown in Fig. 8. Such construction by increasing slightly, preferably in small but determinate amount, the velocity of the gas flow, further assists in preventing carbon formation at the duct outlets.

An important application of the invention is based upon the additional control of the rate and extent of the partial combustion of the carbonaceous vapor or gas used in making carbon black so as to facilitate formation of a uniform, thin flame front, and its maintenance around a stream of the said vapor or gas moving in streamline, non-turbulent flow within a heated, unobstructed enclosed space, thereby to supply the heat for decomposing the gas within the flame front as the gas diffuses from the gas stream out to the flame front, substantially unaffected by any fluid turbulence.

The hot gas in the flame front has a comparatively high viscosity; and the carbon formed on the inside of the flame front by decomposition of the gas on the inside thereof is substantially all held against the inner face of the flame front or gaseous sheath and passes upwardly through the furnace, thus protected, in a definite, smooth stream of flow.

In practicing the invention according to a preferred form thereof, air and natural gas are introduced into a furnace of the type shown in Fig. 1,—the relative rates of flow of the gas and air being controlled at a ratio of about 1 to 1.2, and the burner assembly being designed to give a ratio of total air duct area to total gas duct area of from 6 to 6.5 to 1, and to give a ratio of air duct thickness to gas duct thickness of 3.5 to 1,— this arrangement thereby providing sufficient air for the complete combustion of 60 to 65% of the natural gas at the relative velocities of flow. Each gas duct had a thickness sufficient to permit the flow therefrom of a gas stream having an initial effective thickness of ½ inch. The proportion of the thickness of the lower portions of the duct walls to the thickness of the upper margins of the duct wall and to the height of the beveled portion of the duct wall was 4 : 1 : 12.

Combustion occurs adjacent the interfaces between the contiguous gas and air strata, permitting the development of a high temperature and a controlled combustion along the line of contact of the gas and air within the furnace, forming flame fronts. By controlling the relative velocities of the gas and air, and the temperatures maintained within the furnace,—and particularly in the decomposition zone therein,—the flame fronts formed serve as viscous envelopes to maintain uniform streamline flow of the remainder of the hydrocarbonaceous gas containing carbon black in a manner to protect the latter in substantial degree both from the oxidizing influence of the air and from direct contact with the furnace wall, while in the high temperature zone of the furnace. Due to the beveled construction at the upper marginal portions of the burners, streamline flow of the fluids is greatly facilitated, and incipient turbulence in the gas flow adjacent the burner tips is avoided. This prevents the formation of carbon black containing substantial amounts of intermediate decomposition products such as can be removed from the carbon black by extraction with benzol or acetone. Furthermore, it makes possible the uninterrupted operation of the carbon black furnace for as much as ten times as long as heretofore has been possible when unbeveled tips were employed in a process of this type.

The invention is not to be regarded as limited to the particular beveled burner tips and ducts shown and described, either as to shape or size. The degree and the nature of the bevel employed may be varied widely; and the size of the burner ducts adapted to be so beveled may likewise be varied,—providing they are so constructed as to facilitate streamline flow of the fluids respectively flowing through and around them within the carbon black furnace.

Control of the carbon black operation has been further facilitated by thus assuring a uniform flame thickness throughout the period of operation. Heretofore when burner ducts having upper flat ends have been used, the resultant gas stream thickness has been increased at points near but above the duct outlets, which in turn has caused the production of a flame that was much longer than calculated, due to the greater time required for diffusion of the combustion-supporting gas through the gas stream. Therefore, where it is desired to maintain careful control of the period of time during which the carbon black produced in the high temperature flame zone is permitted to remain in that zone, it is important that the flame thickness be readily subject to control, as will be obvious.

By the practice of the invention in the manner described, the aforementioned objects have been attained, and it has been possible both to increase the yield and to improve the physical properties of the carbon black produced. The invention is susceptible of modification within the scope of the appended claims.

Having thus described my invention, I claim:

1. Apparatus for making carbon black comprising an unobstructed heat-insulated furnace chamber, a plurality of spaced narrow gas ducts mounted in parallel vertical planes in the lower portion of the chamber and adapted to discharge gas upwardly thereinto, and means for introducing a determinate amount of air at a controlled velocity into the chamber adjacent the lower end of the gas ducts, each of the gas ducts being provided with a beveled marginal portion adjacent its outlet end and having its inner and outer wall surfaces gradually sloping toward each other at the said outlet end for facilitating streamline flow of fluids respectively moving upwardly within and around each of the said gas ducts.

2. Apparatus for the production of carbon black comprising a vertically-disposed furnace having an unobstructed interior chamber portion, a plurality of uniformly-spaced gas ducts mounted in the lower portion of the chamber and arranged in parallel, valved means for conducting a fluid to the said ducts and for controlling the velocity of gas flow therethrough, means for introducing air at a controlled rate into the chamber adjacent the inlet ends of the gas ducts and for distributing the air uniformly around the latter, the upper portions at least of the said gas ducts being constructed of heat resistant metal and having one or both of the inner and outer surfaces of each duct sloping toward each other at the outlet ends thereof, thereby facilitating streamline flow of the respective fluids moving upwardly within and around said ducts.

3. Apparatus for the production of carbon black comprising a vertically-disposed furnace having an unobstructed interior chamber portion, a plurality of uniformly-spaced gas ducts mounted in the lower portion of the chamber and arranged in parallel valved means for conducting a fluid to the said ducts and for controlling the velocity of gas flow therethrough, means for introducing air at a controlled rate into the furnace adjacent the inlet ends of the gas ducts and for distributing the air uniformly around the latter, a plurality of burner tips constructed of heat-resistant metal, means for detachably supporting one of the said burner tips at the upper end of each of the respective gas ducts, each of the said burner tips having at least one of the surfaces of its upper marginal end beveled whereby the inner and outer wall surfaces of each tip slope gently toward each other adjacent the tip outlet.

4. Apparatus as defined in claim 3, in which each of the burner tips is provided with a shouldered portion adapted to co-operate with the upper marginal portion of a respective gas duct for supporting the former.

5. Apparatus as defined in claim 3, in which a plurality of narrow flattened gas ducts are employed, the same being grouped adjacent each other with their major transverse axes disposed in parallel vertical planes.

6. Apparatus as defined in claim 3 in which the said gas ducts have a tubular cross-sectional construction.

7. Apparatus as defined in claim 3 in which the said gas ducts have a circular cross-sectional construction.

8. Apparatus for the production of carbon black comprising a vertically-disposed heat insulated furnace chamber having an unobstructed upper interior portion, a plurality of spaced gas ducts arranged in the lower portion of the chamber adjacent each other, each of the said ducts, being adapted to conduct therethrough a fluid stream having an effective thickness of between ⅛ and ⅝ of an inch, the upper marginal portion of each burner being beveled to a metal thickness of not more than ⅛ inch, and means for flowing air at a controlled velocity through the chamber and for uniformly distributing it around each of the said spaced gas ducts.

9. Apparatus for the production of carbon black comprising a vertically-disposed heat insulated furnace having an unobstructed interior chamber, at least one gas duct disposed in the lower portion of the said chamber and extending upwardly therein, means for uniformly distributing and flowing air upwardly around each duct at a controlled rate, the inner and outer surfaces of the upper marginal portion of each duct sloping gently to within ⅛ inch of each other to permit flow of fluids upwardly into the furnace with a minimum disturbance of the direction of flow thereby preventing fluid turbulence adjacent each gas duct outlet.

10. The method of making carbon black in an unobstructed enclosed heated space, which comprises introducing into the lower portion of said space a plurality of contiguous narrow streams, alternate streams respectively containing a gaseous or vaporous hydrocarbon and a combustion-supporting gas, and bringing contiguous streams of the respective fluids to within at least ⅛ inch of each other while separated by a solid diaphragm immediately prior to flowing the fluids into mutual contact within the heated, enclosed space.

11. The method of making carbon black comprising flowing into a heated enclosed space a plurality of spaced parallel streams containing a gaseous hydrocarbon, a plurality of spaced parallel streams of combustion supporting fluid, individual streams of the latter being interspersed between adjacent hydrocarbon streams, burning portions of each of the respective streams of hydrocarbon in a surrounding flowing atmosphere or stream of combustion supporting fluid, the latter being present in amounts insufficient to permit the complete combustion of the gaseous hydrocarbon, thereby decomposing the unburned portion of said hydrocarbons to produce carbon black, and conducting contiguous streams of hydrocarbon and the combustion supporting fluid to at least as close as ⅛ inch of each other while separated by a solid diaphragm immediately prior to flowing the fluids into mutual contact within the said heated, enclosed space.

12. The method of producing carbon black which comprises directing a streamline flow of a carbonaceous gas and air concurrently in relatively thin distinct and substantially parallel contacting sheets within a combustion chamber, bringing contiguous sheets of the gas and air to within less than ⅛ inch of each other while separated by a solid diaphragm immediately prior to flowing the said sheets into actual contact within the said combustion chamber, thereafter contacting the parallel sheets, partially burning the gases, and collecting the solid products of combustion.

13. The method of making carbon black which comprises introducing a stream of hydrocarbon-containing gas within a confined stream of an oxygen-supplying gas flowing in the same direction within a heated enclosed space, adjusting the velocities of flow of the respective fluid streams through the said space and the volume ratio of the said respective gases flowing therethrough, thereby producing and maintaining a streamline non-turbulent flow of the said streams throughout a zone of decomposition within the said space, and bringing contiguous streams of the respective gases to within at least ⅛ inch of each other while separated by a thin solid diaphragm immediately prior to contacting them within the said space.

In testimony whereof I affix my signature.

THEODORE P. KELLER.